March 8, 1927.
R. D. PARKER
VEHICLE SIGNALING WINDOW
Filed April 14 1925
1,620,166
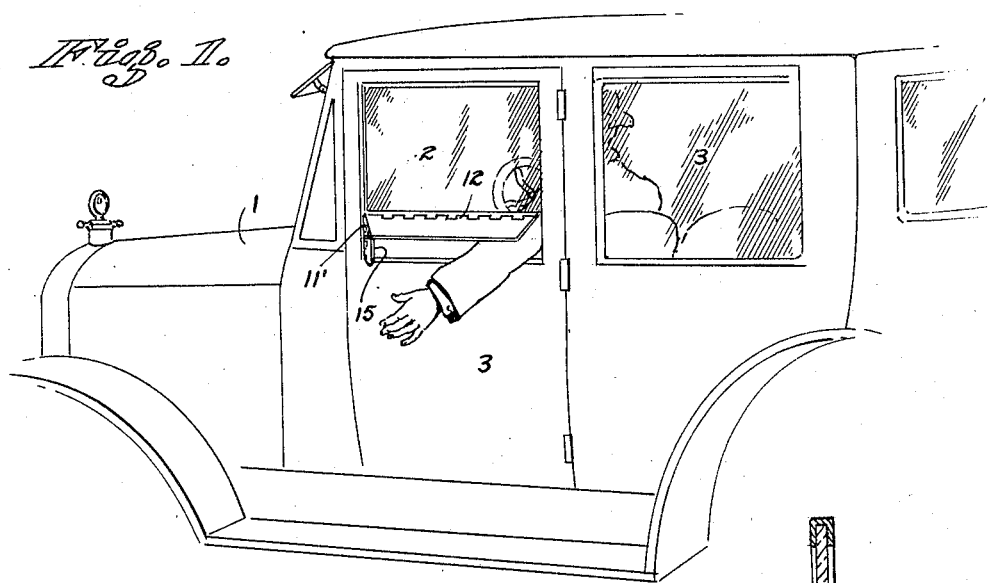
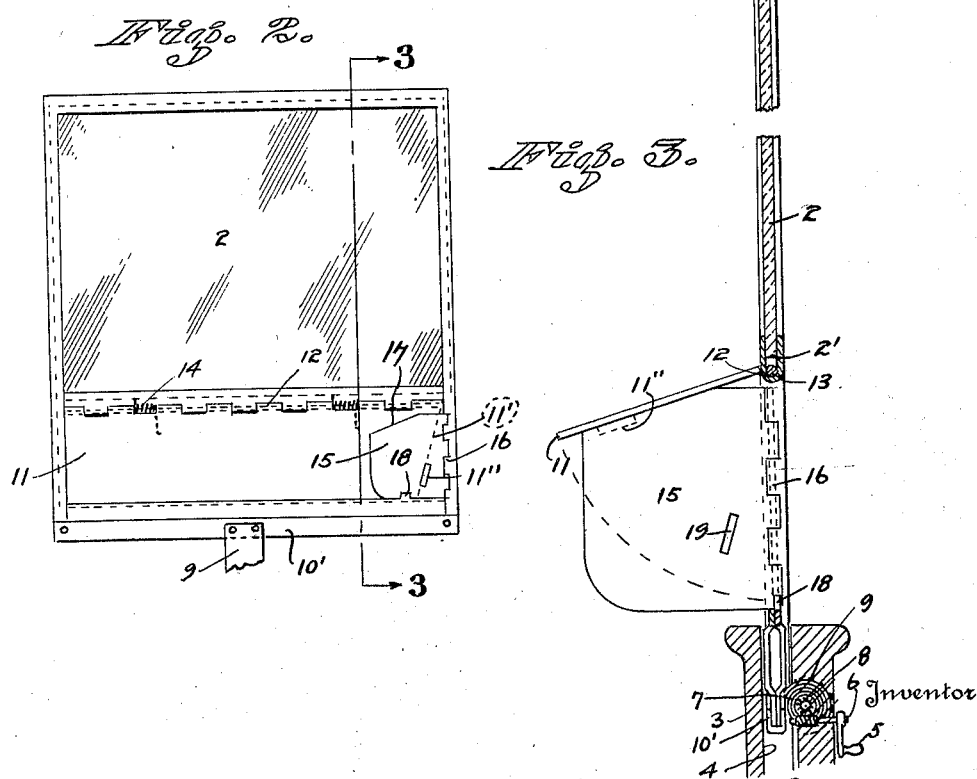
Ralph D. Parker
By Miller, Henry & Boyken
His Attorneys Patented Mar. 8, 1927.

1,620,166

UNITED STATES PATENT OFFICE.

RALPH D. PARKER, OF SAN FRANCISCO, CALIFORNIA.

VEHICLE SIGNALING WINDOW.

Application filed April 14, 1925. Serial No. 22,997.

This invention relates to road vehicles of the enclosed body type, especially automobiles wherein the driver is seated within the body enclosure, such for instance as the coach or sedan type of construction.

The object of my invention is to effect improvements in the construction of such enclosed bodies so that the driver will be enabled to give the usual arm signals even with the glass windows of the body shut.

The invention is carried out preferably in the general manner as shown in the drawings hereto and in which:

Figure 1 is a perspective sketch of a portion of the left side of an automobile of the coach type showing my invention in place and with the driver's arm projecting from the closed vehicle giving an arm signal.

Figure 2 is an elevation drawn to a larger scale showing the glass and its frame removed as a unit from the front door, and as looking at it from within the vehicle.

Figure 3 is a still larger drawing in vertical section as taken along the line 3—3 of Figure 2 but with the signaling panel of the window open.

In further detail at 1 is shown an automobile of the closed type having forward and rearward windows glazed as at 2 and 3.

The glass 2 is in the upper part of the door 3 and is raised and lowered vertically in a slot 4 in the door by any suitable means forming no part of the present invention but for illustrative purposes being here indicated as a crank 5 at the inner side of the door secured to worm shaft 6 operating on a worm 7 to turn a drum 8 all suitably mounted within the door and to which drum a strap 9 is wrapped, the strap being secured at one end to the drum and at the other end to the lower edge 10' of a frame 10 surrounding the light of glass 2.

This frame 10 may entirely surround the glass as shown or be secured to the lower edge only thereof, this being optional, but in any event the frame embraces and projects considerably below the lower edge 2' of the glass as best shown in Figure 3 so as to provide an opening below the glass and through which opening the driver may extend his arm.

It is understood of course that the glass sheet 2 is cut somewhat shorter than the proper size for a full glass window for the door so that the glass sheet plus the arm opening below it approximates the door opening.

The frame 10 may be of any suitable construction and is here shown as a channel strip of metal enclosing the edges of the glass and at the extreme lower edges of the glass being extended as at 10' to form a suitable margin to which any desired window raising and lowering device may be secured, such for instance as the strap 9 aforesaid.

The arm signaling opening below the glass is of course only available for use when the window is closed, for when the glass is lowered the signaling is done over the top of the glass in the usual way.

To close the opening against wind and rain an outwardly opening hinged panel 11 is provided and which is suitably hinged to the transverse member of the frame 10 at the lower edge of the glass, preferably by alternate notching of the frame and lid to form hinge elements 12 around a rod 13 as indicated.

One or more of the hinge elements are cut away and the rod surrounded with a small spiral spring as at 14 with one end reacting against the frame 10 and the other against the lid so as to gently but firmly hold it in closed position, but free to be pushed outward by the hand of the driver when he desires to give a signal.

To retain the panel 11 in open position as shown in Figures 1 and 3 an end plate 15 is provided.

This end plate is hinged to the frame preferably along the forward vertical end as indicated at 16 and is also arranged to open outwardly.

The outer corner of the plate 15 is best rounded at 16 and it is slanted at the upper edge at 17 so that the panel 11 will also slant when open and supported by the plate so as to shed rain.

In order to lessen the wind resistance it is desirable that the plate when extended be less than at right angles with the side of the vehicle and to this end the panel 11 has its forward end cut back along the line 11' as dotted in Figure 2 and this edge is provided with a lip 11" bent at right angles inwardly of the panel so as to form a stop against which the plate rests when fully opened out.

The lid is opened either by pushing against it from within the vehicle, or by pushing the plate 15 to its outward limit so as to lock as it were, the panel in open position.

When the panel and plate are both in open position as shown in Figures 2 and 3 the pressure of the spring actuated panel against the upper edge of the plate will hold the members in open position any length of time either for frequent signaling in city traffic or for ventilation purposes on the highway.

To close the arm opening, the plate 15 is simply pulled inwardly to seat against an inner stop 18, and the panel 11 being spring actuated follows right down bringing the stop 11 into a recess or slot 19 formed in the plate 15 so that the closed panel and plate will lie flat within the thickness of the frame 10.

The frame 10 taken complete with the glass 2, plate 15, panel 11 together with its stops and springs will thus be seen to comprise a unit which may directly replace the present sheet of glass of any closed automobile door and be operated by the present raising and lowering device, no change in any of the surrounding structure being necessary, and therefore the complete frame as described becomes an article ready for sale to fit any existing automobile door, it merely being necessary to have the overall dimension and thickness correspond with existing standards of the glass sheets it is desired to replace.

In constructing my invention various materials may be employed but preference is given to sheet metal panel and plate preferably covered on at least one side if not both with leather or other material as indicated in Figure 3 of the drawing, tho it is evident that the invention is in no way limited to any special construction of the panel and plate as it may be of plain metal, wood, celluloid, or glass, or any combination of these materials, and it is also evident without further drawings that the panel may open downwardly instead of upwards if desired.

I claim:—

1. A unit for a vehicle window comprising a sheet of glass, a flat frame embracing the edges of the glass and having an opening beyond the lower end of the glass, a panel hingedly connected with the frame adjacent the lower end of the glass and covering the opening, and a plate lying over part of the opening and hinged to the frame along a line substantially at right angles to the hinge line of said panel at the forward edge of the glass so as to form when swung outwardly an end wind guard for the opening when the panel is swung outwardly from the glass, the structure when folded lying substantially within the frame thickness so as to be slidable as a unit in a window groove.

2. In an enclosed road vehicle, a window provided with a vertical sheet of glass, a panel hinged at the lower edge of the glass to open outwardly, and a pivoted plate arranged for sustaining the panel in open position at one end only of the panel and forming a shield against a draught blowing from the direction of said end toward the opposite end, said plate being collapsible under said panel to a position substantially in the plane of the glass.

3. In an enclosed road vehicle, a window provided with a glass sheet, a panel hinged at the lower edge of the glass to open outwardly and means for sustaining the panel in such opened position comprising a plate hinged along a vertical line to open outwardly under said panel and positioned by a stop on said panel adapted to nest with said plate when the panel is closed.

RALPH D. PARKER.